(12) United States Patent
Iwai et al.

(10) Patent No.: US 9,800,116 B2
(45) Date of Patent: Oct. 24, 2017

(54) DC BRUSHLESS MOTOR INCLUDING COVER PORTION WITH FAN BLADES

(71) Applicant: Nidec Corporation, Kyoto (JP)

(72) Inventors: Yusuke Iwai, Kyoto (JP); Naoki Tabira, Kyoto (JP); Yosuke Kawano, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 535 days.

(21) Appl. No.: 14/199,214

(22) Filed: Mar. 6, 2014

(65) Prior Publication Data

US 2014/0265739 A1 Sep. 18, 2014

(30) Foreign Application Priority Data

Mar. 15, 2013 (JP) .................................. 2013-053435

(51) Int. Cl.
  *H02K 9/00* (2006.01)
  *H02K 9/06* (2006.01)
  *H02K 9/02* (2006.01)

(52) U.S. Cl.
  CPC ................. *H02K 9/06* (2013.01); *H02K 9/00* (2013.01); *H02K 9/02* (2013.01)

(58) Field of Classification Search
  CPC .. H02K 9/02; H02K 9/06; H02K 9/08; H02K 9/04; H02K 9/12; H02K 9/14; H02K 9/16; H02K 1/32

(Continued)

(56) References Cited

U.S. PATENT DOCUMENTS

| | | | | |
|---|---|---|---|---|
| 3,292,023 A | * | 12/1966 | Kober | ..................... H02K 21/24 310/156.27 |
| 3,482,131 A | * | 12/1969 | Lytle | ....................... H02K 3/04 310/156.37 |

(Continued)

FOREIGN PATENT DOCUMENTS

| | | | |
|---|---|---|---|
| CN | 2682725 Y | | 3/2005 |
| CN | 102594023 A | * | 1/2012 |

(Continued)

OTHER PUBLICATIONS

JP 07-245925a English Machine Translation from JPO office website.*

(Continued)

*Primary Examiner* — Michael Andrews
*Assistant Examiner* — Maged Almawri
(74) *Attorney, Agent, or Firm* — Keating & Bennett, LLP

(57) ABSTRACT

A DC brushless motor includes a housing including a plurality of attachment portions each of which is arranged to extend toward an apparatus, a base portion joined to the attachment portions, and a bearing holding portion joined to the base portion; a bearing member held by the bearing holding portion; a shaft supported by the bearing member to be rotatable about a central axis, and including a portion on one axial side to which blades that perform stirring in a heating chamber are joinable; a rotor holder fixed to the shaft; a rotor magnet held on an inside of a cylindrical portion of the rotor holder; a stator arranged radially inside the rotor magnet; and a circuit board electrically connected with the stator, and arranged axially opposite the opening of the rotor holder.

20 Claims, 8 Drawing Sheets

(58) Field of Classification Search
USPC .............. 310/58, 59, 60 R, 68, 67, 64, 67 R, 310/40 MM; 360/99; 219/678
See application file for complete search history.

(56) References Cited

U.S. PATENT DOCUMENTS

| | | | | |
|---|---|---|---|---|
| 4,604,665 A * | 8/1986 | Muller | ................. | G11B 17/038 310/67 R |
| 5,036,235 A * | 7/1991 | Kleckner | .............. | F16C 25/086 310/191 |
| 5,144,175 A * | 9/1992 | Craggs | ..................... | H02K 1/32 310/61 |
| 5,371,343 A * | 12/1994 | Yoshimura | .............. | A23L 3/365 219/746 |
| 5,693,992 A * | 12/1997 | Kurusu | ................. | F04D 29/282 310/263 |
| 5,990,467 A * | 11/1999 | Yang | ...................... | H05B 6/642 126/21 A |
| 6,130,491 A * | 10/2000 | Mitamura | ............. | F04D 29/281 310/62 |
| 6,208,052 B1 * | 3/2001 | Kershaw | ............... | F04D 29/582 165/121 |
| 6,384,494 B1 * | 5/2002 | Avidano | ................... | H02K 9/06 310/58 |
| 6,565,326 B2 * | 5/2003 | Horng | ................... | F04D 25/066 310/67 R |
| 6,881,938 B2 * | 4/2005 | Kim | ........................ | F16C 33/08 126/21 A |
| 7,061,155 B1 * | 6/2006 | Lee | .......................... | H02K 5/10 310/261.1 |
| 7,616,440 B2 * | 11/2009 | Franz | ................... | F04D 25/082 361/679.48 |
| 7,701,097 B2 * | 4/2010 | Lan | ..................... | F04D 25/0613 310/60 A |
| 8,058,762 B2 * | 11/2011 | Asano | ................. | H02K 1/2793 310/156.33 |
| 9,022,753 B2 * | 5/2015 | Streng | ................... | F04D 25/082 417/366 |
| 9,022,754 B2 * | 5/2015 | Chou | ................... | F04D 25/0613 310/64 |
| 9,447,725 B2 * | 9/2016 | Okada | ..................... | F04B 35/06 |
| 9,537,373 B2 * | 1/2017 | Bledsoe | .................. | H02K 9/06 |
| 2006/0022529 A1 * | 2/2006 | De Filippis | ........... | F04D 25/082 310/58 |
| 2006/0262499 A1 * | 11/2006 | Vinson | .................. | F04D 25/166 361/679.48 |
| 2007/0152521 A1 * | 7/2007 | Park | ....................... | D06F 37/304 310/67 R |
| 2012/0001505 A1 * | 1/2012 | Henke | .................... | H02K 11/33 310/62 |

FOREIGN PATENT DOCUMENTS

| | | | |
|---|---|---|---|
| CN | 102594023 | * | 7/2012 |
| CN | 202725665 U | | 2/2013 |
| DE | 3324076 A1 | * | 4/1984 |
| DE | 3324076 | * | 7/1984 |
| JP | 05-002573 A | | 1/1993 |
| JP | 07245925 A | * | 7/1995 |
| JP | 07245925 A | * | 7/1995 |
| JP | 07-245925 A | * | 9/1995 |

OTHER PUBLICATIONS

DE 3324076 English Machine Translation form EPO offcie webstie.*
CN102594023 English Machine Translation form EPO office webstie.*
CN102594023A English translation.*
JP07245925A English translation.*
DE3324076A1 English Translation.*
Ip.com search Jul. 19, 2017.*

* cited by examiner

DC BRUSHLESS MOTOR INCLUDING COVER PORTION WITH FAN BLADES

BACKGROUND OF THE INVENTION

1. Field of the Invention

The present invention relates to a DC brushless motor, and more specifically to a DC brushless motor preferably used to drive blades designed for stirring in a heating chamber.

2. Description of the Related Art

An AC (Alternating Current) motor has been used as a motor to drive blades designed for stirring in a heating chamber of a microwave oven. A temperature in a heating chambers of some microwave ovens is increased to a maximum of 300° C. to 500° C. The motor to drive the blades designed for stirring in the heating chamber of the microwave oven is used in an environment where heat is easily transmitted from the heating chamber to the motor, because a shaft of the motor is arranged to project into the heating chamber of the microwave oven, and the motor is attached to a side wall of the heating chamber. In general, electronic components have heat-resistant temperature of about 180° C. at the highest, and can therefore not be used in an environment where heat in the heating chamber is immediately transmitted thereto. In this regard, the AC motor is suitable for use in a high temperature environment because the AC motor does not need to have electronic components mounted thereon. On the other hand, it has been difficult to use a DC (Direct Current) brushless motor in such an environment. Accordingly, in order to use the DC brushless motor as the motor to drive the blades designed for stirring in the heating chamber of the microwave oven, it is necessary to provide a cooling mechanism in the microwave oven or the DC brushless motor.

Concerning a cooling mechanism of the DC brushless motor, an outer-rotor brushless motor for use in an office automation appliance is disclosed in JP 07-245925 A. This motor includes a rotor, a stator, a motor shaft, a bearing portion, a cup-shaped bracket, and an attachment base. In FIG. 4 of JP 07-245925 A, a rotor frame 7 includes a plurality of rising portions 7a defined in a top plate of the rotor frame. Once the rotor frame is caused to rotate in a direction indicated by an arrow in FIG. 4 of JP 07-245925 A, outside air is sucked into the rotor frame by a fan and the rising portions defined in the top plate of the rotor frame to blow the air to windings, a core, and a housing inside the rotor frame, whereby the windings, the core, and the housing are cooled.

In recent years, microwave ovens with higher added value have been demanded. Specifically, a reduction in the probabilities of uneven cooking and uneven temperature has been demanded. In addition, an increase in the number of cooking modes has been demanded to make it possible to employ a variety of methods of cooking. In order to achieve the reduction in the probabilities of the uneven cooking and the uneven temperature, a fine adjustment of a rotation rate of the blades designed for stirring in the heating chamber and shifting between normal rotation and reverse rotation of the blades designed for stirring in the heating chamber are demanded. In addition, in order to increase the number of cooking modes, a capability to set a plurality of patterns of the rotation rate of the blades designed for stirring in the heating chamber is demanded. Accordingly, there is a demand for use of a DC brushless motor capable of fine control as the motor to drive the blades designed for stirring in the heating chamber.

However, in the case where the DC brushless motor described in JP 07-245925 A is used in the microwave oven, heat from the heating chamber tends to be easily transmitted to a circuit board because an end portion of the DC brushless motor on the circuit board side, i.e., an upstream side of air flow, is arranged inside the heating chamber. Therefore, electronic components mounted on the circuit board may become damaged. It is therefore impossible to adopt this DC brushless motor as the motor to drive the blades designed for stirring in the heating chamber of the microwave oven.

SUMMARY OF THE INVENTION

Preferred embodiments of the present invention provide a DC brushless motor which is able to operate in an environment where heat is easily transmitted to the motor, e.g., a motor used to drive blades designed to perform stirring in a heating chamber, the motor being able to reduce transmission of the heat to a circuit board and other components of the motor.

A DC brushless motor according to a preferred embodiment of the present invention is a DC brushless motor used to drive blades that perform stirring in a heating chamber, the motor including a housing including a plurality of attachment portions each of which is arranged to extend toward one axial side where the heating chamber exists, a base portion arranged on an opposite axial side of the attachment portions and joined to the attachment portions, and a bearing holding portion joined to the base portion; a bearing member held by the bearing holding portion; a shaft supported by the bearing member to be rotatable about a central axis, and including a portion on the one axial side to which the blades that perform stirring in the heating chamber are joinable; a rotor holder fixed to the shaft, being in or substantially in a shape of a covered cylinder with an opening facing toward the opposite axial side, and including a cover portion and a cylindrical portion; a rotor magnet held on an inside of the cylindrical portion of the rotor holder; a stator arranged radially inside the rotor magnet; and a circuit board electrically connected with the stator, and arranged axially opposite the opening of the rotor holder. The cover portion of the rotor holder includes a through hole passing therethrough in an axial direction, and a blade defined integrally with the cover portion and arranged to produce air current passing from the opposite axial side toward the one axial side.

Preferred embodiments of the present invention are able to reduce transmission of heat generated in the heating chamber to the circuit board and other components of the motor, and are accordingly able to provide a DC brushless motor, e.g., a motor used to drive blades that perform stirring in the heating chamber, which is usable in an environment where heat is easily transmitted to the motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 2:
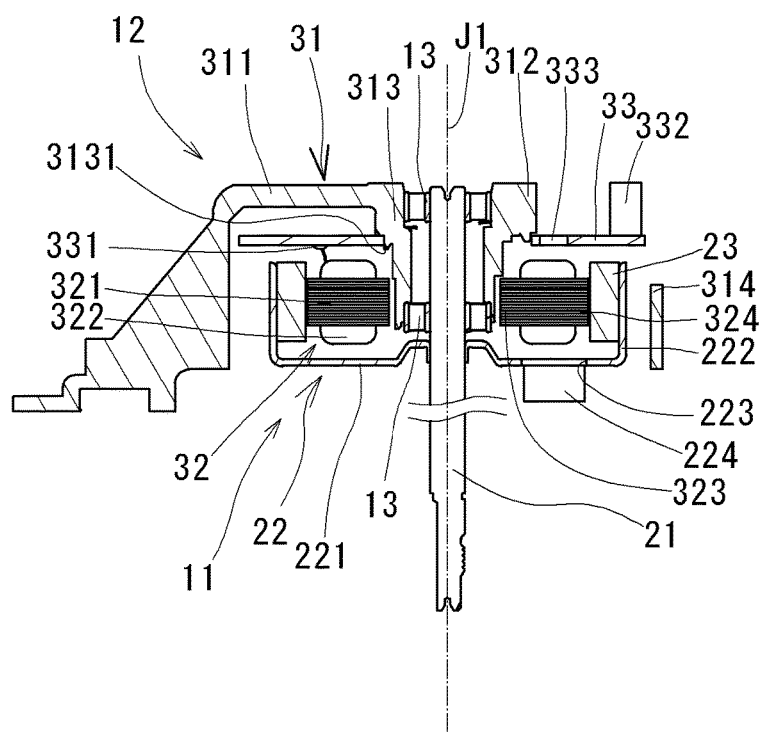
FIG. 2 is a cross-sectional view of a DC brushless motor 1 according to a first preferred embodiment of the present invention.

It is assumed herein that a vertical direction is defined as a direction in which a central axis of a DC brushless motor extends, and that an upper side and a lower side along the central axis in FIG. 2 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel or substantially parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially". Also note that the "upper side" and the "lower side" assumed in the present specification correspond to an "opposite axial side" and "one axial side" as recited in the claims, respectively.

First Preferred Embodiment

Figure 1:
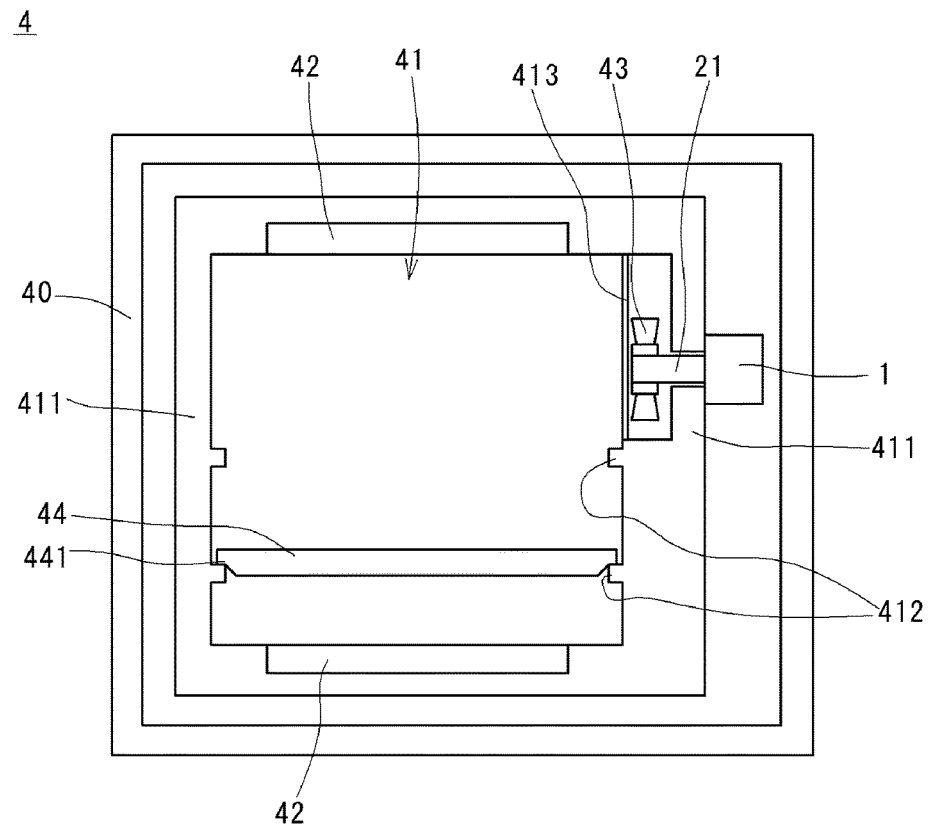
FIG. 1 is a schematic diagram of a microwave oven 4 in which a DC brushless motor 1 according to a preferred embodiment of the present invention may be used.

A DC brushless motor 1 according to a first preferred embodiment of the present invention will be described below. The DC brushless motor 1 is preferably installed, for example, in a microwave oven 4. Note that the DC brushless motor 1 according to the first preferred embodiment may not necessarily be used in the microwave oven 4, but may be used in many other various environments to drive blades that perform stirring in a heating chamber. FIG. 1 is a schematic diagram of the microwave oven 4 in which the DC brushless motor 1 according to the first preferred embodiment of the present invention can be used. Referring to FIG. 1, heating chamber 41 in which to cook an object to be heated with heat is provided in a main body 40 of the microwave oven 4. The heating chamber 41 is in the shape of a box, and a front side thereof is openable. One or more pairs of opposed rails 412 on which a tray or trays 44 are to be mounted are preferably provided in both side walls 411 of the heating chamber 41. Heating devices 42 are arranged at a top portion and a bottom portion of the heating chamber 41. Examples of the heating devices 42 include, for example, heaters and microwave supplying devices.

The DC brushless motor 1 is attached to an outside of one of the side walls 411 of the heating chamber 41. The DC brushless motor 1 includes a shaft 21 arranged to pass through the side wall 411 of the heating chamber 41, and stirring blades 43 that perform stirring in the heating chamber. The stirring blades 43 are joined to the shaft 21 directly or through another member. The stirring blades 43 that perform stirring in the heating chamber are arranged adjacent to the side wall 411 in the heating chamber 41. Moreover, the stirring blades 43 that perform stirring in the heating chamber are preferably covered with a wire net 413 so as not to interfere with another object during rotation thereof.

Each tray 44 is preferably mounted on a corresponding pair of rails 412 in the heating chamber 41 such that the tray 44 is removable from the heating chamber 41. The object to be heated is mounted on a mounting surface of the tray 44. The tray 44 is placed in the heating chamber 41 with a flange portion 441 of the tray 44 mounted on the rails 412. Then, the heating devices 42 are activated to heat and cook the object to be heated which is mounted on the mounting surface. While the object is cooked, the stirring blades 43 that perform stirring in the heating chamber are caused to rotate as necessary to change a temperature distribution in the heating chamber 41.

Figure 3:
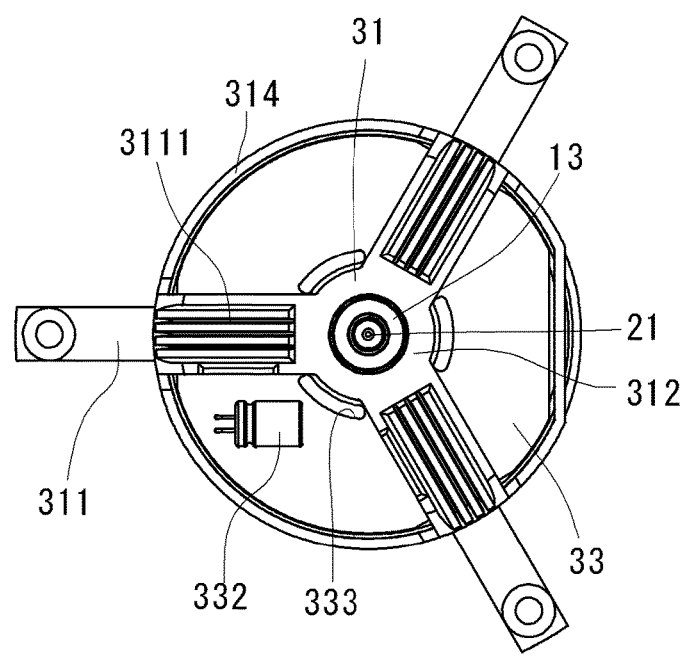
FIG. 3 is a plan view of the DC brushless motor 1 according to the first preferred embodiment of the present invention.
Figure 4:
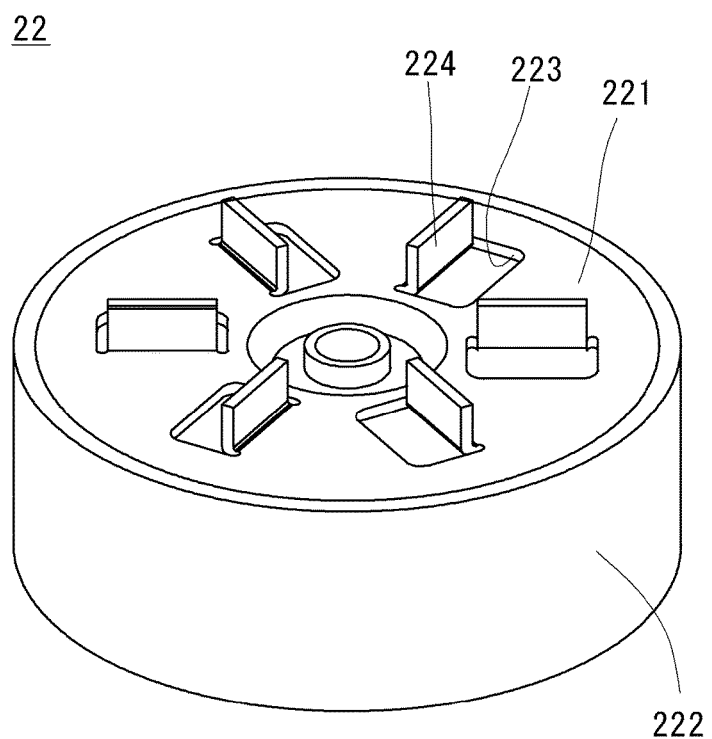
FIG. 4 is a perspective view of a rotor holder 22 of the DC brushless motor 1 according to the first preferred embodiment of the present invention.

FIG. 2 is a cross-sectional view of the DC brushless motor 1 according to the first preferred embodiment of the present invention. FIG. 3 is a plan view of the DC brushless motor 1 according to the first preferred embodiment of the present invention. FIG. 4 is a perspective view of a rotor holder 22 of the DC brushless motor 1 according to the first preferred embodiment of the present invention. Note that, in FIG. 2, for the sake of convenience only a section of the DC brushless motor 1 is shown. The DC brushless motor 1 is preferably used as a driving source of the stirring blades 43 that perform stirring in the heating chamber of the microwave oven 4. The DC brushless motor 1 is preferably of an outer-rotor type. The DC brushless motor 1 preferably includes a rotating portion 11, a stationary portion 12, and two bearing members 13, each of which is preferably, for example, a ball bearing. The rotating portion 11 is arranged to rotate about a central axis J1 extending in a vertical direction with respect to the stationary portion 12. Note that the bearing members 13 are not limited to the ball bearings, and that an oil-impregnated sintered bearing, a fluid dynamic bearing, or the like may be used instead of the ball bearings.

Referring to FIGS. 2 and 3, the rotating portion 11 preferably includes the shaft 21, the rotor holder 22, and a rotor magnet 23. In FIG. 2, an end portion of the shaft 21 which faces the heating chamber 41 is arranged to face downward. The rotor holder 22 is preferably in or substantially in the shape of a covered cylinder with an opening facing toward an opposite axial side, i.e., upward. The rotor holder 22 is produced by subjecting a thin plate to press working. A cover portion 221 of the rotor holder 22 includes a hole portion defined in a center thereof, and the hole portion is fixed to an axial middle portion of the shaft 21. The rotor magnet 23 is fixed to an inner circumferential surface of a cylindrical portion 222 of the rotor holder 22. The rotor magnet 23 may be cylindrical or substantially cylindrical. Alternatively, a plurality of magnets may be arranged in a circumferential direction. The detailed shape of the rotor holder 22 will be described below.

The stationary portion 12 preferably includes a housing 31, a stator 32, and a circuit board 33. The housing 31 includes attachment portions 311, a base portion 312, a bearing holding portion 313, and a cylindrical portion 314. The attachment portions 311 are a plurality of portions each of which is arranged to extend toward one axial side where the heating chamber 41 exists, i.e., from the base portion 312 toward the microwave oven 4. In the present preferred embodiment, the attachment portions 311 are preferably three in number, for example, and are spaced from one another in the circumferential direction. A surface of each attachment portion 311 on the opposite axial side, i.e., an upper surface of the attachment portion 311, preferably includes a fin portion 3111 defined by a plurality of plate-shaped portions. Each plate-shaped portion of the fin portion 3111 is arranged to extend upward in the axial direction. The base portion 312 is arranged to join the plurality of attachment portions 311 to one another. The base portion 312 is arranged on the opposite axial side of the attachment portions 311. The base portion 312 is in or substantially in the shape of a disk. Note that the base portion 312 is arranged to have an outside diameter smaller than an outside diameter of the circuit board 33, which will be described below. The bearing holding portion 313 is joined to the base portion 312. The bearing holding portion 313 is a cylindrical portion extending from the base portion 312 downward in the axial direction. The bearing members 13 are inserted radially inside the bearing holding portion 313, and are fixed thereat. In the present preferred embodiment, the bearing members 13 preferably include two ball bearings. The shaft 21 is inserted in an inner race of each bearing member 13. The shaft 21 is thereby supported to be rotatable about the central axis J1. The cylindrical portion 314 is a cylindrical portion axially spaced from the base portion 312 and arranged to join the plurality of attachment portions 311 to one another. An axial upper end of the cylindrical portion 314 is arranged at an axial level lower than that of an upper end of the cylindrical portion 222 of the rotor holder 22, which will be described below.

The stator 32 includes a stator core 321 and coils 322. The stator core 321 is preferably defined by, for example, a plurality of thin electromagnetic steel sheets placed one upon another in the vertical direction. The stator core 321 includes an annular core back portion 323 centered on the central axis J1, and a plurality of tooth portions 324 arranged to extend radially outward from the core back portion 323 in a radial manner. A radially inner portion of the stator core 321 is fixed to an outer circumferential surface of the bearing holding portion 313 of the housing 31. Note that the stator core 321 may be indirectly fixed to the housing 31. Each coil 322 is preferably defined by a conducting wire wound around a separate one of the tooth portions 324 of the stator core 321. The rotor magnet 23 is arranged radially outside the stator 32, and a torque is produced between the stator 32 and the rotor magnet 23.

The circuit board 33 is a preferably plate-shaped member arranged to extend perpendicularly or substantially perpendicularly to the central axis J1. A radially inner end portion of the circuit board 33 is fixed to the housing 31 through plastic deformation of a crimping portion 3131 of the bearing holding portion 313, so that the circuit board 33 is fixed to the housing 31. In addition, in the present preferred embodiment, an adhesive is applied to a position where the circuit board 33 and the housing 31 are in contact with each other.

A connection portion 331 to which the conducting wires extending from the coils 322 of the stator 32 are electrically connected through a solder is arranged on the circuit board 33. In addition, electronic components, such as, for example, an IC, are mounted on the circuit board 33. Furthermore, a connector 332 is mounted on a surface of the circuit board 33 on the opposite axial side, i.e., an upper surface of the circuit board 33. The connector 332 is arranged radially outward of the stator 32. Moreover, the connector 332 is arranged between two of the attachment portions 311, and is exposed from the housing 31 when viewed from above in the axial direction.

The circuit board 33 includes flow channels through which air currents pass from the opposite axial side toward the one axial side, i.e., from above downward. In the present preferred embodiment, the flow channels preferably include a plurality of holes 333 arranged radially inward of the rotor magnet 23. The above arrangement of the holes 333 and the rotor magnet 23 prevents the rotor magnet 23 from interfering with the air currents, permitting smooth flow of the air currents. Moreover, the holes 333 are preferably arranged radially inward of the connection portion 331. This arrangement permits the flow channels to be defined almost without affecting a mounting space on the circuit board 33. Furthermore, at least a portion of each hole 333 is arranged radially outward of the base portion 312. This arrangement makes it easier for the air current to flow into the hole 333 while the motor 1 is running. Note that, in the case where a radially outer edge of the base portion 312 is arranged radially outward of a radially outer edge of the circuit board 33, base portion through holes are defined in portions of the base portion 312 which are opposed to the holes 333 of the circuit board 33. In the present preferred embodiment, the holes 333 preferably are three in number, for example, and the holes 333 are arranged at regular intervals in the circumferential direction. Furthermore, at least a portion of each hole 333 is arranged circumferentially between two of the attachment portions 311, and is exposed from the housing 31 when viewed from above in the axial direction.

Figure 5:
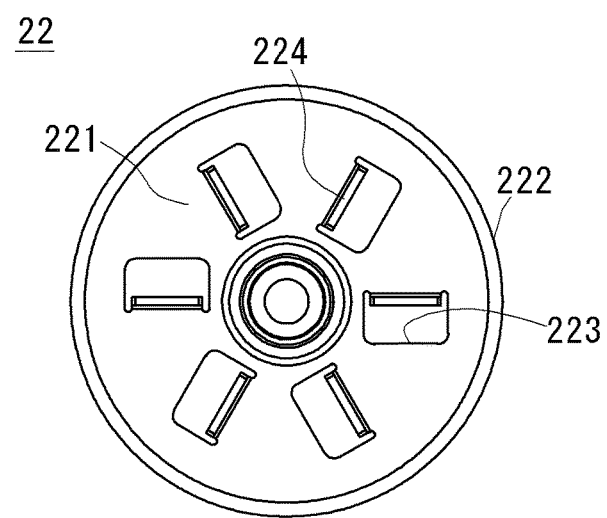
FIG. 5 is a plan view of the rotor holder 22 of the DC brushless motor 1 according to the first preferred embodiment of the present invention.

FIG. 4 is a perspective view of the rotor holder 22. FIG. 5 is a plan view of the rotor holder 22. Referring to FIGS. 4 and 5, the shape of the rotor holder 22 will be described in detail below. The rotor holder 22 is preferably in or substantially in the shape of a covered cylinder with the opening facing toward the opposite axial side. The rotor holder includes the cover portion 221, which is preferably in or substantially in the shape of a disk, and the cylindrical portion 222, which is arranged to extend from the cover portion 221 toward the opposite axial side, i.e., upward.

The cover portion 221 of the rotor holder 22 preferably includes through holes 223 and fan blades 224. Each through hole 223 is a hole passing through the cover portion 221 in the axial direction. In the present preferred embodiment, the through holes 223 are preferably six in number, for example. The through holes 223 are preferably arranged at regular intervals in the circumferential direction. Each fan blade 224 is a plate-shaped portion arranged to extend from the cover portion 221 toward the one axial side, i.e., downward, in parallel or substantially in parallel with the central axis J1. In other words, each fan blade 224 and the cover portion 221 are perpendicular or substantially perpendicular to each other. The fan blade 224 is defined integrally with the cover portion 221. An end portion of the fan blade 224 on the one axial side is arranged on the opposite axial side relative to an attachment surface of each attachment portion 311. The fan blade 224 is opposed to the side wall 411. In the present preferred embodiment, the side wall 411 serves as a wall surface which separates the heating chamber 41 and the rotor holder 22. The fan blades 224 are arranged to produce air current passing from the opposite axial side toward the one axial side, i.e., air current passing from above downward, while the rotating portion 2 is rotating. An outer end of each fan blade 224 is arranged at the same circumferential position as that of an inner end of the fan blade 224. In other words, the blades fan 224 are so-called radial blades. The fan blades 224 are arranged in a radial manner. The fan blades 224 are preferably six in number, for example. The fan blades 224 are arranged at regular intervals in the circumferential direction. Each fan blade 224 is arranged adjacent to and on one circumferential side of a corresponding one of the through holes 223. Note that, in the present preferred embodiment, the through holes 223 and the fan blades 224 are preferably defined by press working, and it is therefore possible to define the through holes 223 and the fan blades 224 at the same time.

Each fan blade 224 is arranged to have a thickness smaller than that of the cover portion 221. In addition, the fan blade 224 is arranged to extend from a position radially outward of a radially inner end of the corresponding through hole 223 to a position radially inward of a radially outer end of the through hole 223. Moreover, on a straight line passing through the fan blade 224 and the central axis J1, a portion of the through hole 223 exists radially outward of the fan blade 224, and another portion of the through hole 223 is provided radially inward of the fan blade 224. Furthermore, the fan blade 224 is arranged to have an axial dimension (i.e., height) smaller than the circumferential dimension of the through hole 223. This contributes to increasing an area through which the air current is able to pass. That is, when a negative pressure is produced around the fan blade 224 as a result of air being blown radially outward by the fan blade 224, air is easily sucked in through the through hole 223. Moreover, since an outer end of the through hole 223 is arranged radially outward of the outer end of the fan blade 224, a flow channel can be secured at a position where the air flows the fastest. This makes it easier for the air to be sucked in through the through hole 223.

The radially outer end of each through hole 223 is preferably arranged radially inward of a radially inner end of the rotor magnet 223. This prevents the rotor magnet 223 from interfering with the air currents, permitting smooth flow of the air currents.

The radially inner end of each through hole 223 is preferably arranged radially outward of a boundary between the core back portion 323 and each tooth portion 324 of the stator core 321. This prevents the core back portion 323 of the stator core 321 from interfering with the air currents, permitting smooth flow of the air currents.

Figure 6:
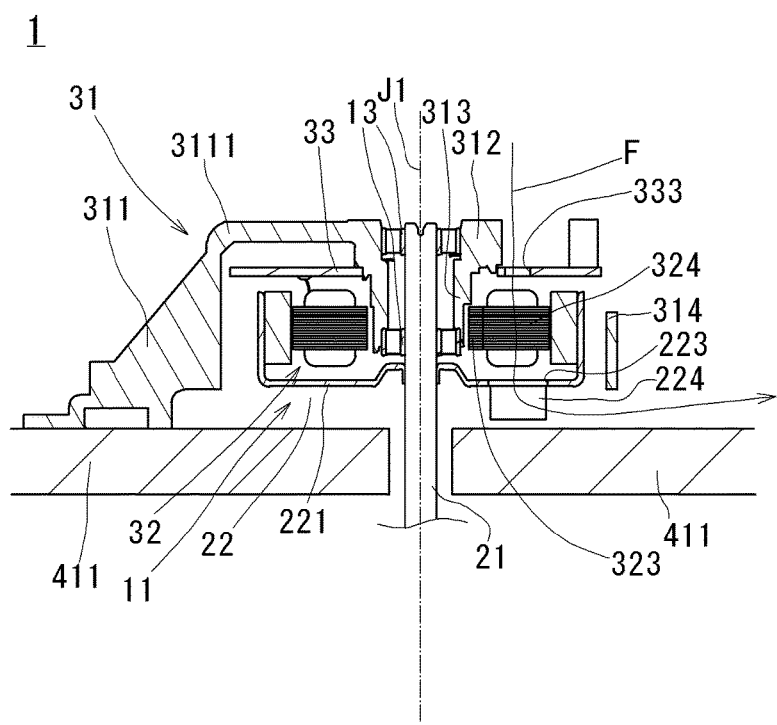
FIG. 6 is a schematic diagram for explaining a flow of air current caused by the DC brushless motor 1 according to the first preferred embodiment of the present invention.

FIG. 6 is a schematic diagram for explaining a flow of the air currents caused by the DC brushless motor 1 illustrated in FIG. 1.

A situation in which the DC brushless motor 1 is used will be described below with reference to FIGS. 1 and 6. The DC brushless motor 1 is attached to the side wall 411 of the heating chamber 41 as a result of the attachment portions 311 of the housing 31 being fixed to the microwave oven 4. The stirring blades 43 that perform stirring in the heating chamber are arranged in the heating chamber 41. The shaft 21, which is used to drive the stirring blades 43 that perform stirring in the heating chamber, is therefore arranged to extend into the heating chamber 41.

Here, a temperature in the heating chamber 41 is increased to a maximum of about 300° C. to about 500° C., for example. Therefore, regarding the DC brushless motor 1, which is used to drive the blades that perform stirring in the heating chamber, heat from inside the heating chamber 41 needs to be cooled in order to prevent the heat from being transmitted to a main body (including the bearing members 13, the rotor magnet 23, the stator 32, the circuit board 33, and so on) of the DC brushless motor 1.

There are preferably three main paths through which the heat is transmitted from the heating chamber 41 to the DC brushless motor 1. First, the heat is transmitted from the heating chamber 41 to the DC brushless motor 1 through the attachment portions 311 fixed to the side wall 411 of the heating chamber 41 (a first path). Second, the heat is transmitted from the heating chamber 41 to the DC brushless motor 1 through the shaft 21 arranged to extend into the heating chamber 41 (a second path). Third, the heat is transmitted from the heating chamber 41 to the DC brushless motor 1 through a radiant heat radiating from the side wall 411 of the heating chamber 41 (a third path).

Therefore, in order to prevent the heat from being transmitted to the main body of the DC brushless motor 1, the following measures need to be taken. Regarding the first path, the attachment portions 311 and the base portion 312 need to be cooled. Regarding the second path, the shaft 21 and a member close to the shaft 21 (i.e., the cover portion 221 of the rotor holder 22) need to be cooled. Regarding the third path, the side wall 411 of the heating chamber 41 or a member equivalent thereto needs to be cooled. In other words, the wall surface needs to be cooled.

An operation of the DC brushless motor 1 when the DC brushless motor 1 is driven will now be described below. Once the DC brushless motor 1 is driven, the rotating portion 11 is caused to rotate. In the rotating portion 11, the fan blades 224 are provided in the cover portion 221 of the rotor holder 22, and air current F directed radially outward in the vicinity of each fan blade 224 is caused.

The air current F passes through a path illustrated in FIG. 6. That is, first, a negative pressure is produced in the vicinity of each fan blade 224 as a result of air current directed radially outward being caused in the vicinity of the fan blade 224. Next, air above each through hole 223 is caused to flow downward through the through hole 223. This is because the fan blades 224 are opposed to the side wall 411 on the one axial side, and the side wall 411 prevents air from flowing into any through hole 223 from below the fan blade 224 on the one axial side. Next, air outside the DC brushless motor 1 is caused to flow toward each flow channel defined in the circuit board 33. In the present preferred embodiment, a temperature increases with decreasing distance from the heating chamber 41. In addition, the heat from the heating chamber 41 is transmitted to the base portion 312 through the attachment portions 311. The housing 31 is preferably made of, for example, aluminum or an aluminum alloy, and therefore has a higher heat transfer efficiency than that of the air. Accordingly, air above the housing 31 has a lower temperature than that of the housing 31. Therefore, the attachment portions 311 and the base portion 312 of the housing 31 are cooled by the flow of the air currents. Note that provision of the fin portion 3111 in each attachment portion 311 increases a surface area of the attachment portion 311. This increases efficiency with which the attachment portion 311 dissipates the heat when air passes close thereto.

Next, inside the DC brushless motor 1, the air current F reaches the cover portion 221 of the rotor holder 22 after passing between the tooth portions 324 of the stator core 321. In this process, the bearing holding portion 313 and the stator core 321 are cooled to dissipate heat which has been transmitted to each of the bearing members 13 and the stator 32.

Further, after reaching the cover portion 221 of the rotor holder 22, the air current F passes through the through hole 223 from the opposite axial side to the one axial side. As a result, the side wall 411 of the heating chamber 41 or the member equivalent thereto, in addition to the rotor holder 22, is cooled.

Finally, the air current F is directed radially outward in the vicinity of the fan blade 224. Thus, the air current F, which has increased in temperature after cooling various places, moves radially outward out of the DC brushless motor 1. In addition, at this time, a portion of each attachment portion 311 near the side wall 411 and the cylindrical portion 314 are also cooled. The cylindrical portion 314 prevents the air current which has moved radially outward from returning radially inward.

Movement of the air current F along the above-described path results in constant supply of air current having a temperature close to that of an outside air into the DC brushless motor 1, cooling surrounding portions of the DC brushless motor 1. The heat transmitted from the heating chamber 41 to the DC brushless motor 1 is thus dissipated out of the DC brushless motor 1.

Note that, because the fan blades 224 according to the present preferred embodiment preferably are radial blades, the air currents are always caused to flow from the opposite axial side toward the one axial side regardless of whether the fan blades 224 are caused to rotate in a normal (clockwise) direction or in a reverse (counterclockwise) direction. Therefore, even when the DC brushless motor is adopted as the driving source of the blades that perform stirring in the heating chamber to perform complicated control, such as shifting between normal rotation and reverse rotation, a reduction in transmission of the heat to the DC brushless motor 1 is achieved.

Moreover, the axial upper end of the cylindrical portion 314 of the housing 31 is arranged at an axial level lower than that of an axial upper end of the cylindrical portion 222 of the rotor holder 22. This enables air current to flow into the DC brushless motor 1 through a gap between the circuit board 33 and the cylindrical portion 314.

Second Preferred Embodiment

Figure 7:
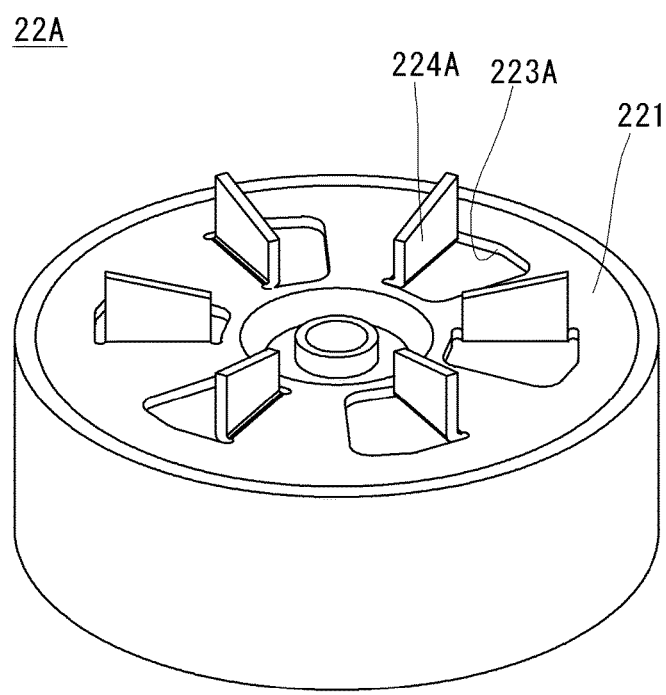
FIG. 7 is a perspective view of a rotor holder 22A according to a second preferred embodiment of the present invention.
Figure 8:
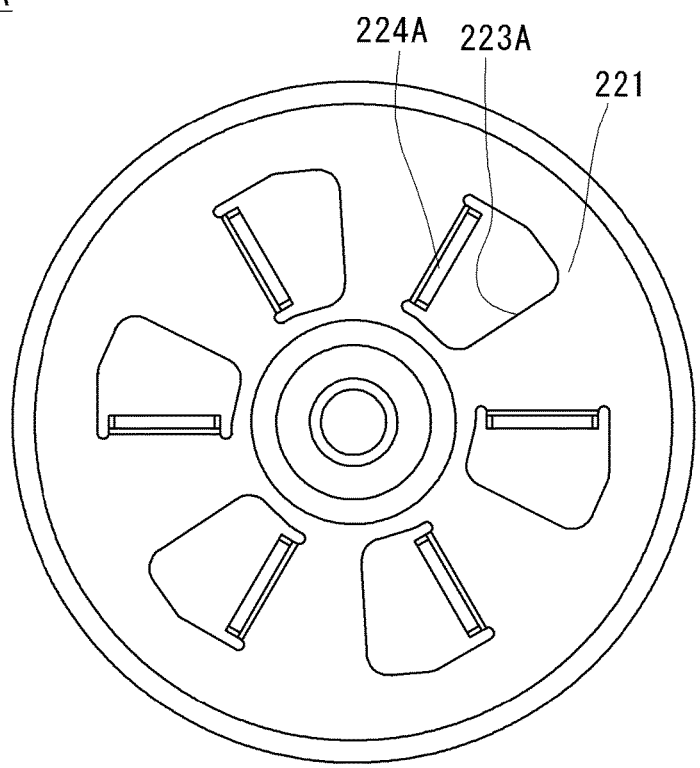
FIG. 8 is a plan view of the rotor holder 22A according to the second preferred embodiment of the present invention.

FIG. 7 is a perspective view of a rotor holder 22A according to a second preferred embodiment of the present invention. FIG. 8 is a plan view of the rotor holder 22A according to the second preferred embodiment of the present invention. The second preferred embodiment will be described below with reference to FIGS. 7 and 8. Note that members other than the rotor holder 22A are preferably similar to the equivalent members in the first preferred embodiment, and description thereof is omitted.

Referring to FIGS. 7 and 8, each of through holes 223A according to the present preferred embodiment is arranged to increase in circumferential width in a radially outward direction. This enables the through hole 223A to be increased in size compared to the through hole 223 according to the first preferred embodiment. This results in an increase in flow of air currents passing through an interior of a DC brushless motor 1A according to the present preferred embodiment. Thus, each through hole 223A is preferably arranged to have a circumferential width greater than that of a plate-shaped portion of the cover portion 221 at the same radial position.

In addition, each of fan blades 224A according to the present preferred embodiment is arranged to increase in axial height in the radially outward direction. This leads to an increase in the flow of the air currents passing through the interior of the DC brushless motor 1A. Note that the through holes 223A and the fan blades 224A are preferably defined by press working, and it is therefore possible to define the through holes 223A and the fan blades 224A at the same time.

Example Modifications of Preferred Embodiments

While preferred embodiments of the present invention have been described above, the present invention is not limited to the above-described preferred embodiments. For example, although each flow channel defined in the circuit board according to each of the above-described preferred embodiments preferably is a hole, for example, the flow channel may be a cut recessed radially inward at a portion of an outer circumferential surface of the circuit board.

Also, a single large hole centered on the central axis may be defined in the circuit board as a flow channel. In this case, however, it is necessary to fix the circuit board at a different position by a different method from those of each of the above-described preferred embodiments.

The circuit board may not necessarily be fixed to the bearing holding portion, but may be fixed to another position. Also, the circuit board may be fixed by a method other than crimping and adhesion. Note, however, that it is preferable that the circuit board should be fixed to the bearing holding portion, to which heat from the heating chamber is less likely to be transmitted, from the viewpoint of preventing the heat from being transmitted to the circuit board.

Although the housing according to each of the above-described preferred embodiments is preferably defined by a single member, the housing may be defined by a combination of two or more members. For example, the attachment portions, the cylindrical portion, and the base portion of the housing may be defined by a single member with the bearing holding portion of the housing defined by a separate member. This arrangement simplifies the shape of the housing, making it possible to define each member by press working.

Note that, although each blade is preferably shaped so as to extend in a direction parallel or substantially parallel to the axial direction toward the one axial side in each of the above-described preferred embodiments, this is not essential to the present invention. For example, each blade may be inclined with respect to the axial direction instead of extending parallel or substantially parallel to the axial direction. Also note that the blades may not necessarily be arranged to extend in the radial manner. However, in the case where the blades are shaped or arranged in any of the above manners, a backflow of air may occur when a rotation direction of the blades is changed, or a significant difference in characteristics of the blades may occur depending on whether the blades are caused to rotate in the normal direction or in the reverse direction. Therefore, the shape and arrangement of the blades according to each of the above-described preferred embodiments are suitable in the case where the shifting between the normal rotation and the reverse rotation is carried out.

Also note that, although the wall surface is preferably the side wall in each of the above-described preferred embodiments, this is not essential to the present invention. That is, a wall surface separate from the side wall may be provided, or the wall surface may be provided in addition to the side wall. Also note that the wall surface may be fixed either in the heating chamber or in the motor, and that the wall surface may be arranged to rotate together with the motor.

It is to be understood by those skilled in the art that other variations and modifications are possible without departing from the scope and spirit of the present invention.

Various preferred embodiments of the present invention are applicable not only to DC brushless motors used to drive blades that perform stirring in a heating chambers, but also to motors used for a variety of purposes.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC brushless motor used to drive stirring blades that perform stirring in a heating chamber, the motor comprising:
   a housing including a plurality of attachment portions each of which extends toward one axial side where the heating chamber is located, a base portion on an opposite axial side of the attachment portions and joined to the attachment portions, and a bearing holding portion joined to the base portion;
   a bearing member held by the bearing holding portion;
   a shaft supported by the bearing member to be rotatable about a central axis, and including a portion on the one axial side to which the stirring blades that perform stirring in the heating chamber are joinable;
   a rotor holder fixed to the shaft, being in or substantially in a shape of a covered cylinder with an opening facing toward the opposite axial side, and including a cover portion and a cylindrical portion;
   a rotor magnet held on an inside of the cylindrical portion of the rotor holder;
   a stator radially inside the rotor magnet; and
   a circuit board electrically connected with the stator, and axially opposite the opening of the rotor holder; wherein
   the cover portion of the rotor holder includes a through hole passing therethrough in an axial direction, and a fan blade integrally defined with the cover portion and producing air current passing from the opposite axial side toward the one axial side;
   the fan blade is adjacent to and on one circumferential side of the through hole; and
   the fan blade extends from a position radially outward of a radially inner end of the through hole to a position radially inward of a radially outer end of the through hole.

2. The DC brushless motor according to claim 1, wherein
   the fan blade extends in a direction parallel or substantially parallel to the axial direction toward the one axial side; and
   an outer end of the fan blade is at a same circumferential position as that of an inner end of the blade.

3. The DC brushless motor according to claim 1, wherein the fan blade has a thickness smaller than that of the cover portion.

4. The DC brushless motor according to claim 1, wherein the fan blade has an axial dimension smaller than a circumferential dimension of the through hole.

5. The DC brushless motor according to claim 1, wherein an end portion of the fan blade on the one axial side is on an opposite axial side relative to an attachment surface of each of the plurality of attachment portions.

6. The DC brushless motor according to claim 1, wherein a radially outer end of the through hole is radially inward of a radially inner end of the rotor magnet.

7. The DC brushless motor according to claim 1, wherein the stator includes:
   a stator core including an annular core back portion and a plurality of tooth portions that extend radially outward from the core back portion in a radial manner; and
   coils, each of which is wound around a separate one of the tooth portions of the stator core; and
   a radially inner end of the through hole is radially outward of a boundary between the core back portion and each tooth portion.

8. The DC brushless motor according to claim 1, wherein the through hole increases in circumferential width in a radially outward direction.

9. The DC brushless motor according to claim 1, wherein the fan blade increases in axial height in a radially outward direction.

10. The DC brushless motor according to claim 1, wherein each of the plurality of attachment portions includes a fin portion defined by a plurality of plate-shaped portions.

11. The DC brushless motor according to claim 1, wherein
    the circuit board includes a connector mounted thereon; and
    the connector is radially outward of the stator.

12. The DC brushless motor according to claim 1, wherein
    an axial distance between the axially lower end of the fan blade and an axially lower end of each of the plurality of attachment portions is shorter than an axial distance between the cover portion and an axially lower end of the stator.

13. The DC brushless motor according to claim 1, wherein a wall surface that separates the heating chamber and the rotor holder is provided on the one axial side of the fan blade.

14. The DC brushless motor according to claim 13, wherein the wall surface is either flush with an attachment surface of each of the plurality of attachment portions or on the opposite axial side relative to the attachment surface.

15. The DC brushless motor according to claim 1, wherein the housing includes a cylindrical portion that joins the attachment portions to each other.

16. The DC brushless motor according to claim 15, wherein an end portion of the cylindrical portion of the housing on the opposite axial side is on the one axial side relative to an end portion of the cylindrical portion of the rotor holder on the opposite axial side.

17. The DC brushless motor according to claim 1, wherein the circuit board and at least one of the base portion and the plurality of attachment portions of the housing include flow channels through which air current flows from the opposite axial side to the one axial side of the circuit board.

18. The DC brushless motor according to claim 17, wherein the base portion has an outside diameter smaller than that of the circuit board.

19. The DC brushless motor according to claim 17, wherein
    the circuit board includes a connection portion to which conducting wires from the coils of the stator are electrically connected; and
    at least a portion of each flow channel is radially inward of the connection portion.

20. The DC brushless motor according to claim 17, wherein the flow channels include a plurality of holes radially inward of the rotor magnet.

* * * * *